United States Patent
Kanda et al.

(10) Patent No.: US 9,836,289 B2
(45) Date of Patent: Dec. 5, 2017

(54) EXECUTABLE CODE GENERATION PROGRAM AND EXECUTABLE CODE GENERATION DEVICE

(71) Applicant: Renesas Electronics Corporation, Tokyo (JP)

(72) Inventors: Kenta Kanda, Kodaira (JP); Atsushi Fujioka, Kodaira (JP); Takuro Uchida, Kodaira (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/265,708

(22) Filed: Sep. 14, 2016

(65) Prior Publication Data

US 2017/0131985 A1  May 11, 2017

(30) Foreign Application Priority Data

Nov. 6, 2015  (JP) .................................. 2015-218069

(51) Int. Cl.
*G06F 9/44* (2006.01)
*G06F 9/45* (2006.01)

(52) U.S. Cl.
CPC .............. *G06F 8/443* (2013.01); *G06F 8/447* (2013.01)

(58) Field of Classification Search
None
See application file for complete search history.

(56) References Cited

U.S. PATENT DOCUMENTS

| | | | | |
|---|---|---|---|---|
| 5,915,114 A | * | 6/1999 | McKee | G06F 8/443 714/E11.2 |
| 9,727,317 B2 | * | 8/2017 | Gao | G06F 8/443 |
| 2003/0140333 A1 | * | 7/2003 | Odaka | G06F 8/71 717/115 |
| 2004/0103110 A1 | * | 5/2004 | Goode | G06F 8/443 |
| 2009/0319835 A1 | * | 12/2009 | Teranishi | G06F 11/3423 714/45 |
| 2013/0074092 A1 | * | 3/2013 | Gounares | G06F 8/443 718/104 |
| 2013/0103749 A1 | * | 4/2013 | Werth | G06F 9/4446 709/203 |
| 2015/0220310 A1 | * | 8/2015 | Amrhein | G06F 8/4435 717/116 |

FOREIGN PATENT DOCUMENTS

JP    2005-149179 A    6/2005

* cited by examiner

*Primary Examiner* — Philip Wang
(74) *Attorney, Agent, or Firm* — McGinn IP Law Group, PLLC

(57) ABSTRACT

In order to improve the efficiency in development of RTOS-mounted application, there is to provide a compiler of creating executable code for running application of calling and using the resource of the RTOS as object on a target device, including an RTOS setting information optimization unit of receiving system configuration information and a compile unit of receiving application source code. The RTOS setting information optimization unit creates RTOS resource creating information including attribute information of usable objects, based on the system configuration information. The compile unit creates the RTOS setting information including a list of the objects actually used, from the analysis result of the RTOS resource creating information and the application source code and the RTOS setting information optimization unit optimizes the above based on the system configuration information.

13 Claims, 13 Drawing Sheets

EXECUTABLE CODE GENERATION PROGRAM AND EXECUTABLE CODE GENERATION DEVICE

CROSS-REFERENCE TO RELATED APPLICATIONS

The disclosure of Japanese Patent Application No. 2015-218069 filed on Nov. 6, 2015 including the specification, drawings and abstract is incorporated herein by reference in its entirety.

BACKGROUND

The invention relates to an executable code generation program and device which generates executable code from application source and particularly, which can be preferably used for configuration of application with real time operating system mounted there.

A real time operating system (Real Time Operating System; hereinafter, abbreviated as RTOS) is built in many applications, particularly, built-in applications. Building (also referred to as "installing") application in RTOS means calling resources managed by the RTOS from an application program and configuring the above to be usable. When developing the RTOS built-in application, it is necessary to perform the initial setting of the resources managed by the RTOS. The resources managed by the RTOS include, for example, a buffer used for synchronization communication function of task, interrupt handler, and data. Items of the initial setting of the resources include, for example, task attribute, stack capacity used by a task, and an activation method of interrupt handler (activation through RTOS or direct activation without interposing RTOS). The resources of the RTOS called by an application program are called an object, which is generated every time of calling the resources managed by the above RTOS.

A person engaged in developing the RTOS-mounted application (hereinafter, referred to as a user) has to create an initial setting information file for RTOS, separately from the application source, in order to do the initial setting. The initial setting information file for RTOS is called a system configuration file. The application source is converted into object code by a compiler and an assembler; similarly, the initial setting information for RTOS is converted into object code by RTOS configurator. The RTOS configurator is a tool for receiving a system configuration file, converting it into a build-target file by a compiler, and outputting the file.

In Japanese Unexamined Patent Application Publication No. 2005-149179, there is disclosed an object number adjustment device that can adjust the number of objects defined in an object definition file to match the number of the objects used in an application program. There is the case in which the number of the objects defined in the object definition file, which is assumed before creating the application program, may be in disagreement with the number of the objects actually used. When the defined number is smaller, there may occur an error of disabling a program from running; while when it is too many, a much more memory space than necessary may be consumed (refer to the paragraphs 0007 to 0009 in the above publication).

SUMMARY

As the results from the investigation of the above patent publication by the inventor et al., the following new problems are found.

According to the technique disclosed in the above patent publication, when disagreement occurs in the number of the objects between the application source program and the object definition file, the object number is automatically adjusted to a proper value, hence to make the configuration of the RTOS-mounted application easy; however, only the object number is targeted for optimization. The configuration information of the objects defined in the system configuration file and the object definition file includes many items such as an activation method of an interrupt handler and a task stack capacity other than the object number. Therefore, it is found that disagreement may occur also in the other items, in the same way as in the object number, between the defined configuration information and the objects actually used by the application source program. Especially, in a built-in system to which the RTOS-mounted application is effective, it is found that the adjustment of only the object number does not achieve a good effect according to an increase in the size.

Accordingly, in order to optimize the configuration information of the objects defined in the system configuration file, a user has to do trial and error. This trial and error, which is a manual return on the design in configuration (development) of an application, deteriorates the development efficiency.

The means to solve the problems will be described as follows and other problems and novel characteristics will be apparent from the description of this specification and the attached drawings.

One embodiment will be described as follows.

There is provided an executable code generation device or its executable code generation program of creating executable code for running an RTOS built-in application on a target device, by executing the executable code generation program in a computer, which is designed as follows.

The application can be used by calling the resource of the RTOS as the object. The executable code generation device includes an RTOS setting information optimization unit of receiving system configuration information and a compile unit of receiving the application source code of the application. The RTOS setting information optimization unit creates RTOS resource creating information including attribute information of usable objects, based on the received system configuration information. The compile unit analyzes the received application source code and creates the RTOS setting information including a list of the objects called by the application. Based on the RTOS setting information created by the compile unit and the system configuration information, the RTOS setting information optimization unit creates the optimized RTOS setting information to create an RTOS setting information file including the above information. Based on the RTOS setting information file, the application source code, and the RTOS, the executable code generation device creates the executable code of the application.

The effects obtained by the embodiment will be briefly described as follows.

In short, since the optimized RTOS setting information is created from the received system configuration information, based on the target application source code, a manual return to adjust the system configuration file becomes unnecessary, hence to improve the efficiency in the development of the RTOS-mounted application.

DETAILED DESCRIPTION

Embodiments will be specifically described. The same codes are attached to the elements having the same functions in all the drawings for use in describing the embodiments and the repeated description thereof is omitted.

First Embodiment

Figure 1:
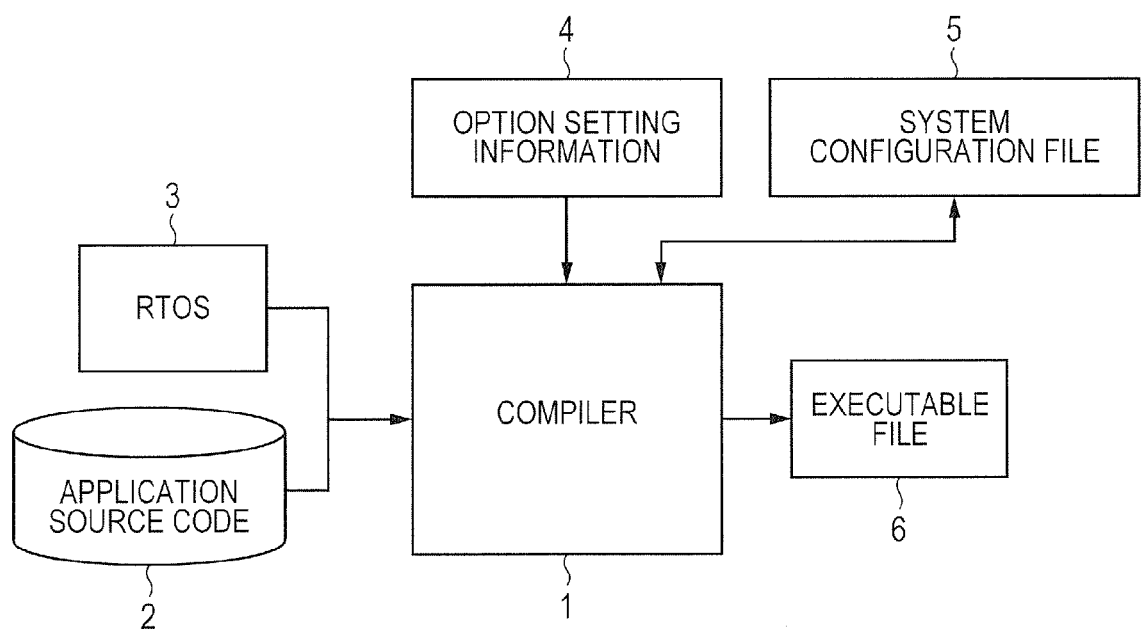
FIG. 1 is a block diagram showing the outline of a first embodiment.

FIG. 1 is a block diagram showing the outline of a first embodiment. A compiler 1 is one form of an executable code generation device. The compiler 1 reads an application source code 2, an RTOS source code 3, option setting information 4, and system configuration information as the initial value of RTOS setting information in a system configuration file 5, creates executable code of RTOS-mounted application, and outputs the above to an executable file 6. Here, the compiler 1 according to the first embodiment has a mechanism for optimizing the RTOS setting information included in the executable file 6, from the RTOS setting information obtained from the system configuration file 5.

Here, the executable code is a code installed and executed in order to operate a predetermined application on a target device, including an instruction code and data. Application source code 2 is a source code describing a function realized by this application in a high level language, an intermediate language such as an assembly language, or a machine language (object code) or their mixture, generally in a way of being divided into a plurality of files. The RTOS 3 is a source code of the RTOS mounted on an application. Similarly to the application source code 2, the RTOS 3 is a source code written in the high level language, the intermediate language such as the assembly language, or the machine language (object code), or their mixture, generally in a way of being divided into a plurality of files. Here, "mounted" or "built-in" means that the application operates according to the control of the RTOS and that various resources provided by the RTOS, for example, task and interrupt handler, can be configured to be usable by calling them through a service call.

Figure 2:
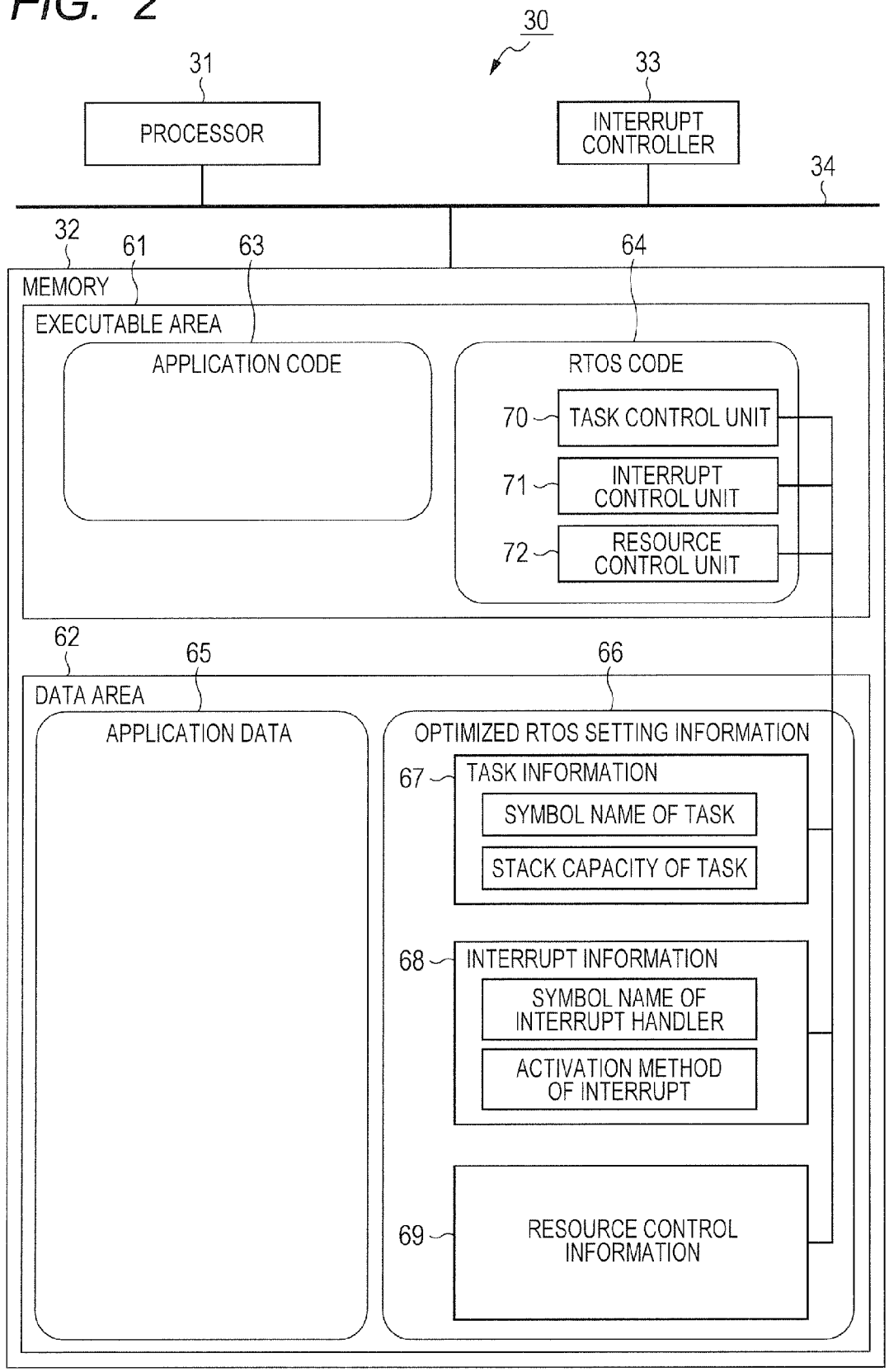
FIG. 2 is a view showing one constitutional example of a target device, for use in describing the constitutional example of the executable code of the above device.

FIG. 2 is a view showing one constitutional example of a target device 30, for use in describing the constitutional example of the executable code of the above device. The target device 30 is a device actually working the RTOS-mounted application, for example, a semiconductor device such as a system Large Scale Integrated circuit (LSI). The target device 30 includes, for example, a processor 31 of performing calculation with an adder and a multiplier mounted there, a memory 32, and an interrupt controller 33, although it is not restricted to these, which are mutually coupled to each other through a bus 34, and the executable code is stored in the memory 32. FIG. 2 is a simple constitutional example with only one processor mounted there; it may further include other various function modules or a plurality of processors, or it may be formed in a complicated structure further including a cache memory through a hierarchical bus. The memory 32 is formed by, for example, a non-volatile memory such as a flash memory or a volatile memory such as Static Random Access Memory (SRAM) and Dynamic Random Access Memory (DRAM) or by the combination thereof, and it may be installed on the same chip as the processor 31 or on another chip.

The executable code is stored in an execution area 61 and a data area 62. The execution area 61 includes application code 63 and RTOS code 64, formed by instruction code strings of the processor 31. The RTOS code 64 includes a task control unit 70, an interrupt control unit 71, and a resource control unit 72. The data area 62 includes application data 65 and RTOS setting information 66. The application data 65 is the data to be accessed when the processor 31 executes the application code 63, and the RTOS setting information 66 is the information referred to when the processor 31 executes the RTOS code 64. The RTOS setting information 66 includes task information 67 such as task symbol name and task stack capacity, interrupt information 68 such as a symbol name of an interrupt handler and an activation method of interrupt, and the resource control information 69. The task information 67, the interrupt information 68, and the resource control information 69 are to be referred to when the processor 31 works the task control unit 70, the interrupt control unit 71, and the resource control unit 72.

According to the first embodiment, the RTOS setting information 66 is optimized by the compiler 1. Optimization of the RTOS setting information means that the RTOS setting information is adjusted to the proper amount of the resources necessary for the actual operation of the application and the RTOS.

The compiler 1 is one form of the executable code generation device as mentioned above. The executable code generation device here means a device of generating executable code from source code, generally including a compiler, an assembler, and a linker. The compiler analyzes the source code described in a high level language, converts the code into an assembly language or directly creates object code. The assembler creates the object code from the source code described in the assembly language. The linker puts together the created object codes to create the executable code. In the first embodiment, the whole executable code generation device is called the compiler 1, and in a narrow sense, a compiler included in this device is called a compile unit, an assembler is called an assembly unit, and a linker is called a linker unit. The executable code generation device as the compiler 1 is realized by a computer with an executable code generation program installed there.

Figure 13:
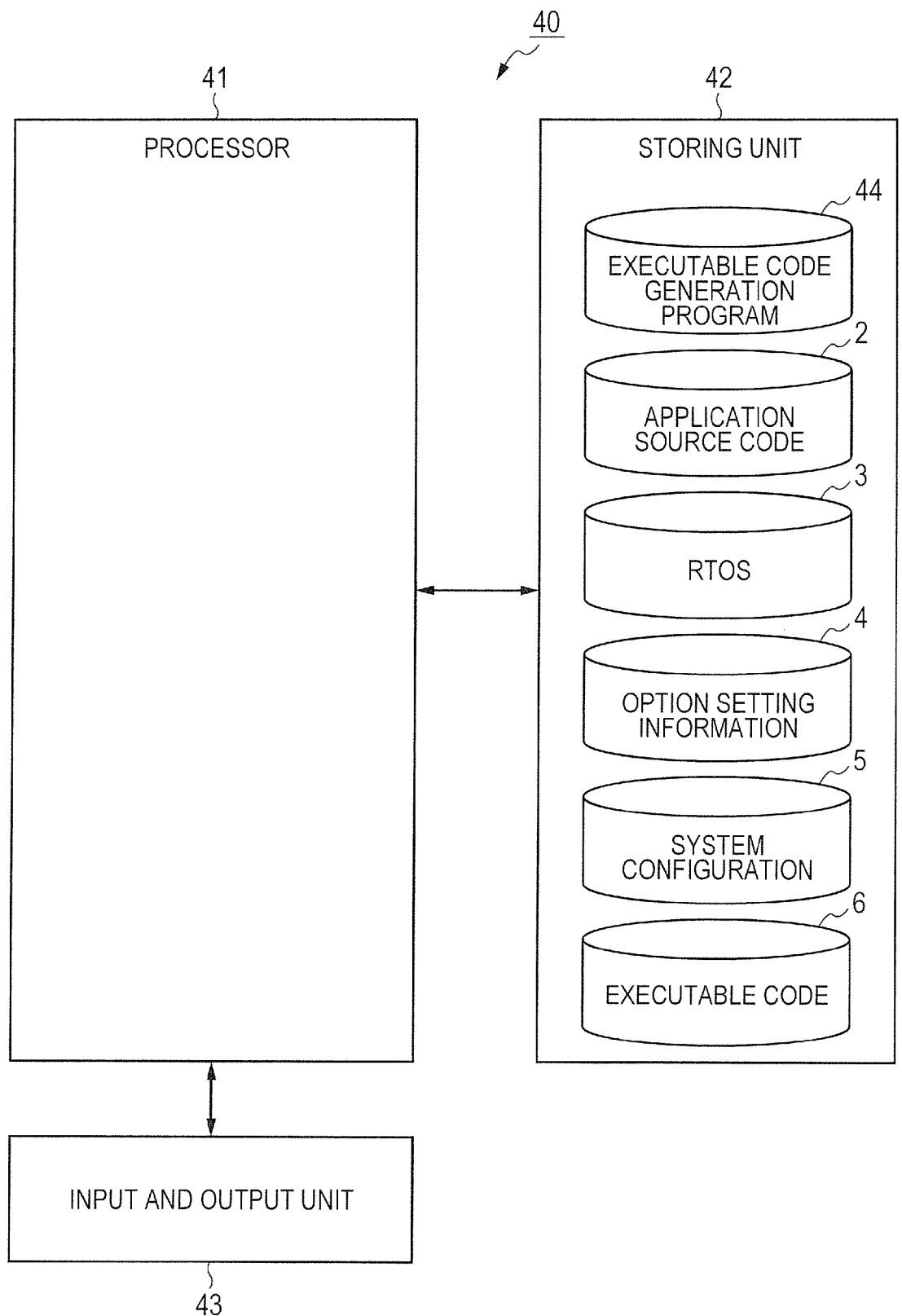
FIG. 13 is a view for use in schematically showing the constitutional example of the executable code generation device with an executable code generation program installed thereof.

FIG. 13 is a view for use in schematically describing the constitutional example of the executable code generation device with the executable code generation program installed there. The computer working as the executable code generation device 40 includes, for example, a processor 41, a storing unit 42, and an input and output unit 43, although it is not restricted to these. The executable code generation program 44 is installed in the storing unit 42; the application source code 2, RTOS 3, option setting information 4, and system configuration information 5 to be accessed in the execution of the above program are also stored in the storing unit 42; and the created executable code 6 is also stored in the storing unit 42. The storing unit 42 is formed by a hard disk drive (HDD: Hard Disc Drive) and a solid drive (SSD: Solid State Drive). It does not have to be formed by a single storing device but may be formed by a plurality of storing devices. In the case of the plural storing devices, they may be formed hierarchically. The executable code generation program 44 is provided being stored in a recording medium. The recording medium may be not only the tangible object such as a Compact Disc (CD), a Digital Versatile Disc (DVD; trademark), a Blue-Ray Disc (trademark), and a Universal Serial Bus (USB) memory but also the intangible object such as wired and wireless communication medium including packet on the network such as the Internet.

The processor 41 is formed by a single or a plurality of processors, to execute the installed executable code generation program 44. The processor 41 gains access to the application source code 2, the RTOS 3, the option setting information 4, and the system configuration information 5 stored in the storing unit 42 at the execution, and outputs the created executable code 6 to the storing unit 42. The input and output unit 43 includes, for example, not only an input device such as a keyboard and a mouse and an output device such as a display and a printer but also a communication interface such as a network port and a drive device of writing and reading data in and from the storing medium such as CD and DVD.

The computer working as the executable code generation device 40 may be formed as a comprehensive application development device with a simulator and a debugger installed there in addition to the executable code generation program 44.

Figure 3:
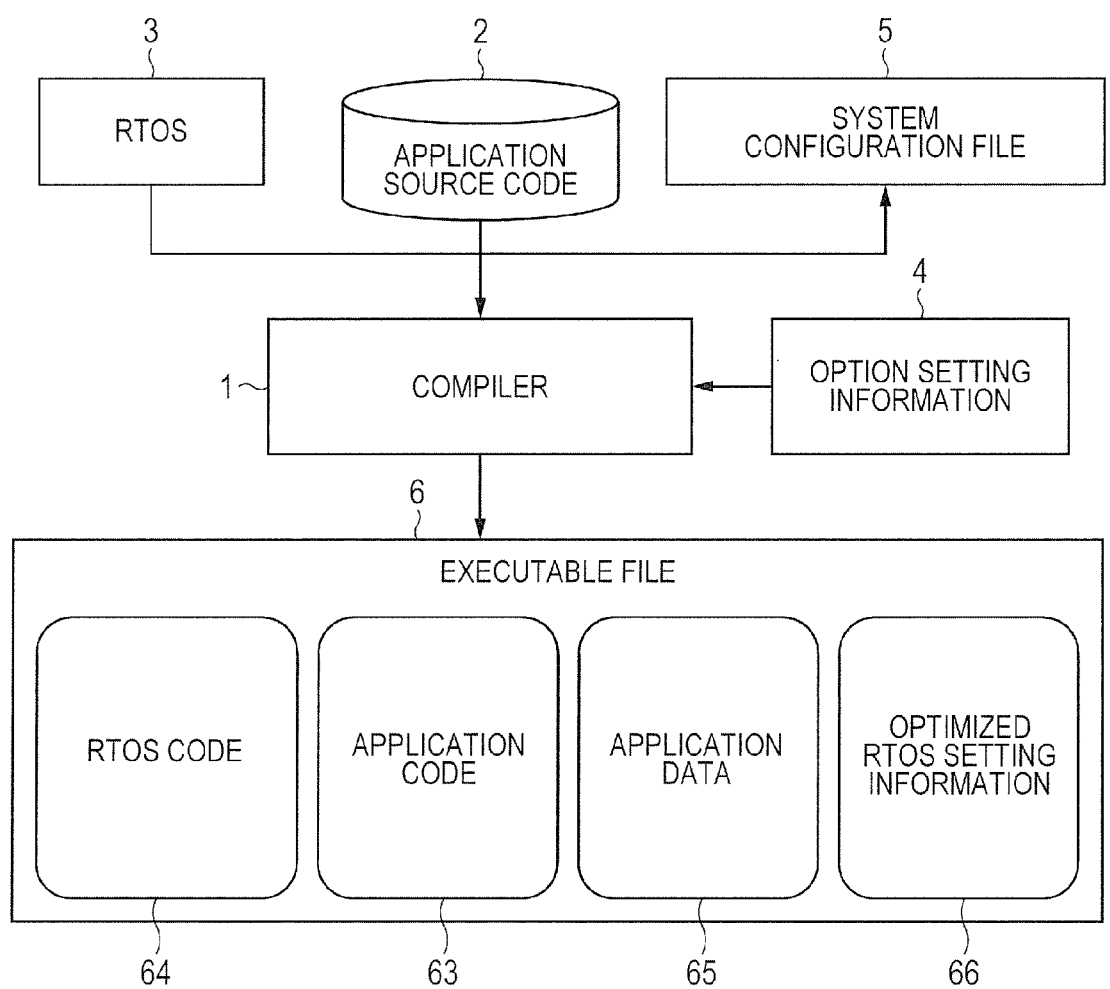
FIG. 3 is a view for use in describing input and output of a compiler according to the first embodiment.

FIG. 3 is a view for use in describing the input and output of the compiler 1 according to the first embodiment. The compiler 1 inputs the application source code 2, the RTOS 3, the option setting information 4, and the system configuration file 5 and outputs the executable file 6 including the created executable code. The system configuration file 5 includes the system configuration information as the initial value of the RTOS setting information and the executable file 6 includes the application code 63, the RTOS code 64, the application data 65, and the optimized RTOS setting information 66.

Figure 4:
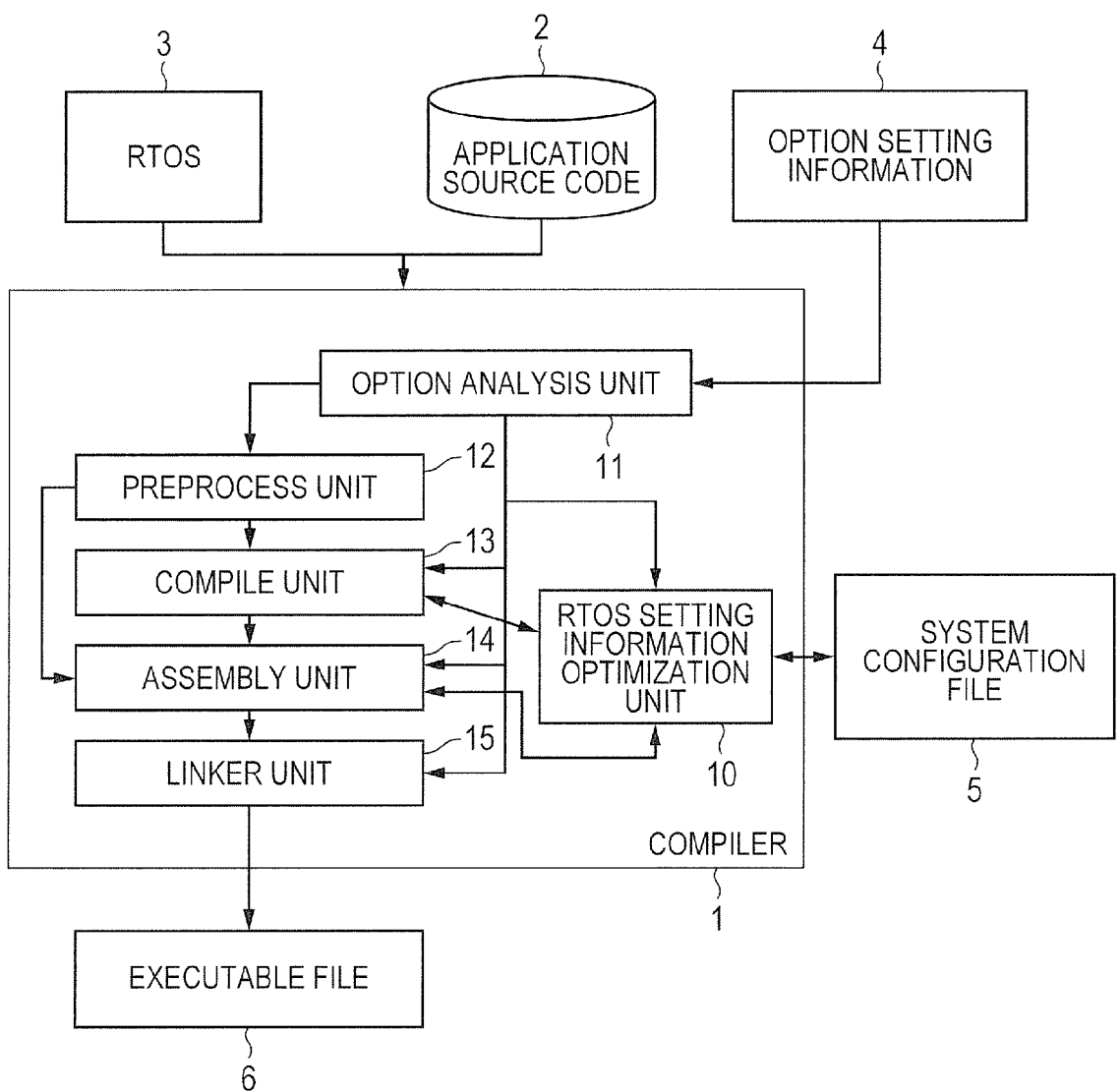
FIG. 4 is a view for use in describing the constitutional example of the compiler according to the first embodiment.

FIG. 4 is a view for use in describing the constitutional example of the compiler 1 according to the first embodiment. It includes an option analysis unit 11, a preprocess unit 12, a compile unit 13, an assembly unit 14, a linker unit 15, and an RTOS setting information optimization unit 10.

The option analysis unit 11 determines optimization policy of the compiler 1 after receiving the option setting information 4 of the compiler specified by an application developer (user). The information of the determined policy is output to the preprocess unit 12, the compile unit 13, the assembly unit 14, the linker unit 15, and the RTOS setting information optimization unit 10.

The preprocess unit 12 performs replacement processing of macro on the application source code 2 directly specified by a user. The replacement-processed application source code 2 is output to the compile unit 13 or the assembly unit 14.

The compile unit 13 performs the compile processing on the input code from the preprocess unit 12 and the application source described in the high level language (C language) directly specified by a user, of the application source code 2, based on the information about the presence or absence of the specified option input from the option analysis unit 11 and the RTOS resource creating information input from the RTOS setting information optimization unit. The RTOS resource creating information includes a list of object IDs which can be specified within the application source and attributes of respective objects.

The compile unit 13 outputs the information necessary for optimization of the RTOS setting information to the RTOS setting information optimization unit 10 during the compile of the application source, and outputs the application source having been converted into assembler instruction as the result of the compile processing, to the assembly unit 14.

The assembly unit 14 performs the assemble processing on the input code from the compile unit 13, the input code from the preprocess unit 12, and the application source described in the assembler language, based on the information about the presence or absence of the specified option input from the option analysis unit 11 and the RTOS resource creating information input from the RTOS setting information optimization unit 10. The RTOS resource creating information includes attributes of respective objects. The application source described in the assembler language is included in the application source code 2, directly specified by a user.

The assembly unit 14 outputs the information necessary for optimization of the RTOS setting information to the RTOS setting information optimization unit 10, during assembling of the application source. The application source having been converted into the object code is output to the linker unit 15.

The linker unit 15 puts together the object code input from the assembly unit 14 and a library-style file (including RTOS) input by a user into one executable code and outputs the code to the executable file 6.

The RTOS setting information optimization unit 10 creates a list of object IDs usable within the application source and the attribute information of the respective objects, based on the information of the system configuration file 4 input by a user and outputs the above to the compile unit 13 and the assembly unit 14. Further, it performs the optimization on the initial RTOS setting information specified in the system configuration file 5, based on the information necessary for optimization of the RTOS setting information input from the compile unit 13 and the assembly unit 14 and the information about the presence or absence of the specified option input from the option analysis unit 11. The RTOS setting information includes an activation method of an interrupt handler, a symbol name of a task and an interrupt handler, and a stack capacity used by each task.

Upon completion of the optimization of the RTOS setting information, the RTOS setting information optimization unit 10 creates the source code with the optimized RTOS setting information described there. This file is called an RTOS setting information file. The unit 10 outputs the RTOS setting information file to the compile unit 13 and/or the assembly unit 14 in order to compile the above. Alternatively, the optimized RTOS setting information may be rewritten into the system configuration file 5. By rewriting the above into the system configuration file 5, a user is enabled to know the most suitable RTOS setting information for the corresponding application.

Figure 5:
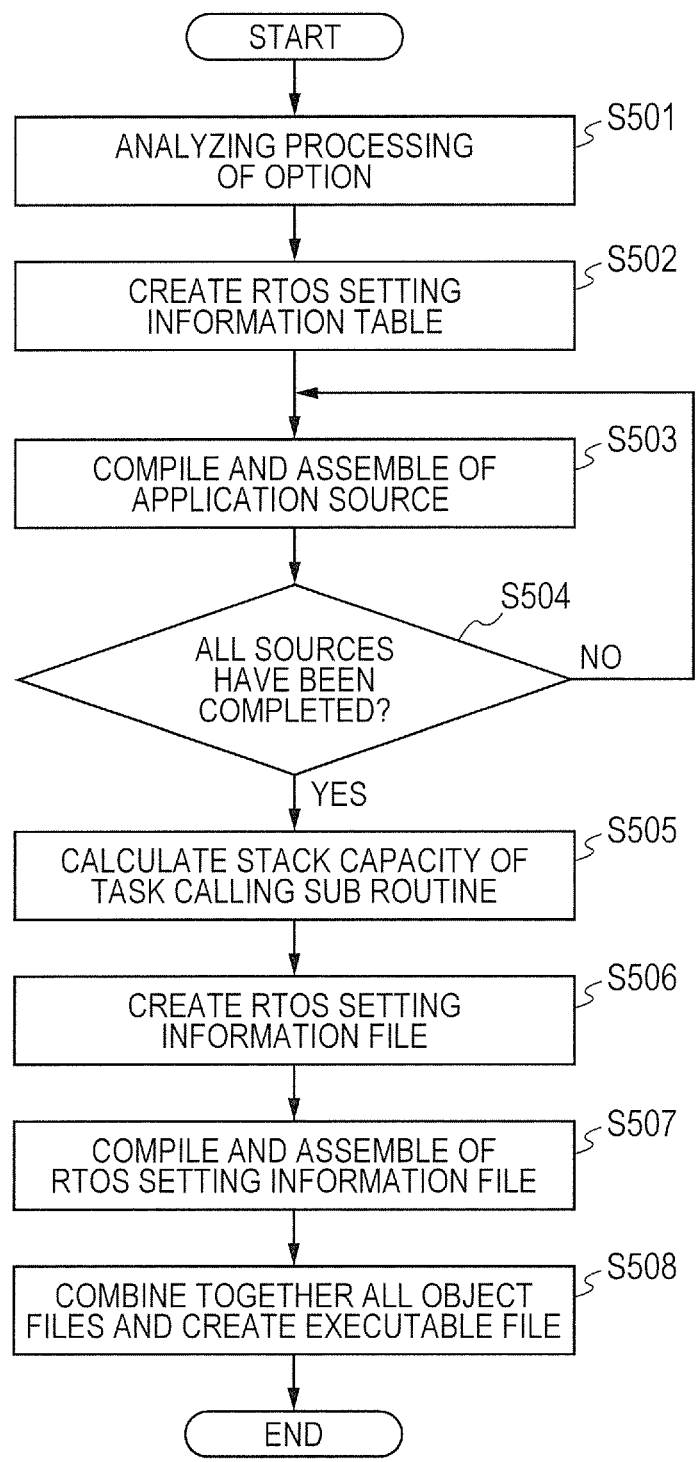
FIG. 5 is a flow chart showing an operation example of the compiler according to the first embodiment.

FIG. 5 is a flow chart showing an operation example of the compiler 1 according to the first embodiment.

Step S501 is performed by the option analysis unit 11 of the compiler. In Step S501, the option specified by a user (option setting information 4) is analyzed, to create a bit pattern indicating the presence or absence of the specified information of the option. This bit pattern is referred to in order to determine the presence or absence of the specified optimization option in the application source, in Step S503. In Step S506, the above is referred to in order to determine the presence or absence of the specified option about the RTOS setting information. Further, the source file name as the compile target is also specified by the option. A list of application source files as the compile target is created and held as a source file table.

Step S502 is performed by the RTOS setting information optimization unit 10. In Step S502, the system configuration file 5 is read to create an RTOS setting information table (not illustrated). The system configuration file 5 is described according to a specified standard and word-and-phase syntax processing is performed on the file to extract the information.

Figure 6:
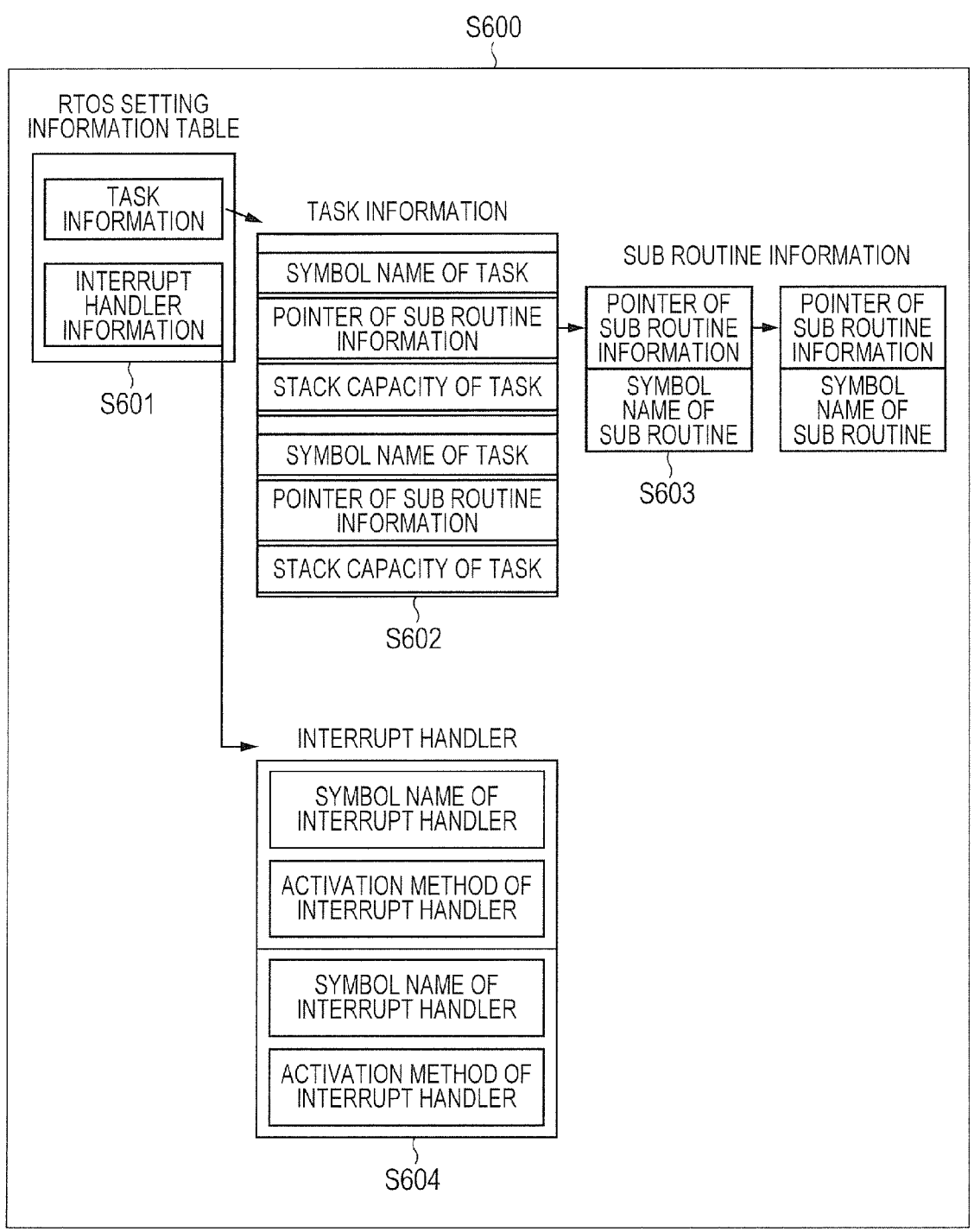
FIG. 6 is a view for use in schematically describing the constitutional example of an RTOS setting information table internally managed by the compiler according to the first embodiment.

FIG. 6 is a view for use in schematically describing the constitutional example of the RTOS setting information table S600 inwardly managed by the compiler 1 of the first embodiment. The RTOS setting information table S600 has a pointer S601 to the task information S602 and the interrupt handler information S604. The task information S602 and the interrupt handler information S604 are formed in a table. Of the RTOS setting information of the initial values described in the system configuration file 5, necessary information at compile and only the information that can be optimized, of the information obtained during the compile, is left and stored in the RTOS setting information table S600. In short, when redundant information is described in the system configuration file 5, the redundant information is deleted. As the task information S602, the symbol name of a task and the stack capacity of a task are obtained and held. The stack capacity used by the RTOS is uniquely determined by the attribute of a task specified in the system configuration file 5. Therefore, the capacity used by the RTOS is previously stored in the stack capacity of a task. Further, the above information has a space for storing a pointer to sub routine information S603 having sub routine symbol names. Further, the interrupt handler information S604 has a space for holding a bit pattern indicating the symbol names of interrupt handlers and activation methods of the interrupt handlers. The RTOS setting information table S600 is used in Step S503 and Step S506 in FIG. 5.

The description is returned to FIG. 5.

In Step S503, compile and assemble of the application source is performed. A file name is obtained from the source file table created in Step S501 and is targeted for the compile or assemble. Referring to the RTOS setting information table S600 created in Step S502 at the compile time of the application source, error of the application source is judged and code expansion is performed. The function (resource) provided by the RTOS is called and used by generally executing the Application Programming Interface (API) called a service call. When there is not any ID value of an object specified in a service call in the RTOS setting information table S600, disagreement occurs between the application source and the system configuration file; therefore, a compile error is output to interrupt the compile.

The syntax analysis by the compiler 1 in Step S503 will be described more specifically.

Figure 7:
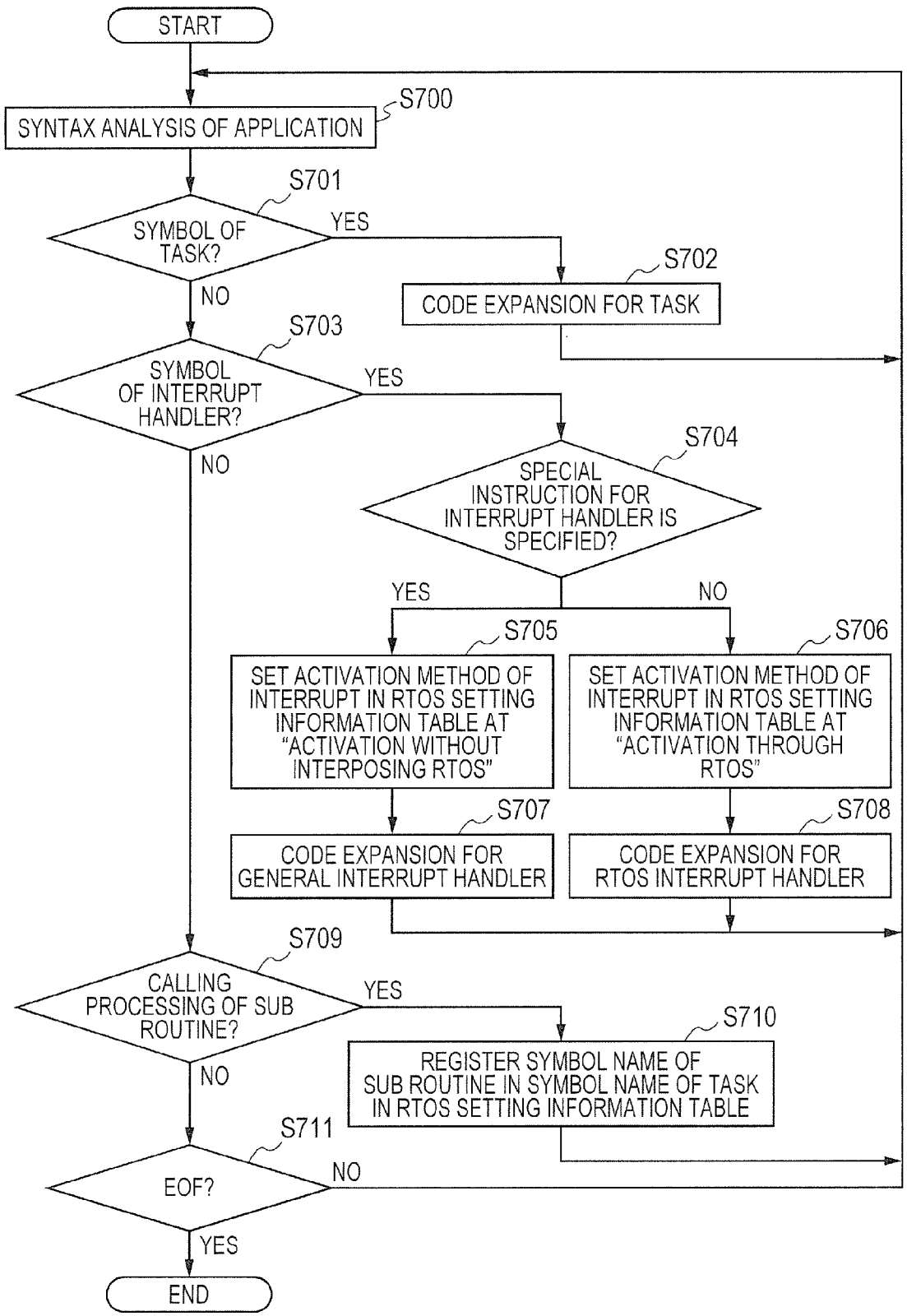
FIG. 7 is a flowchart showing an operation example of syntax analysis by the compiler according to the first embodiment.

FIG. 7 is a flow chart showing an operation example of syntax analysis by the compiler 1.

In Step S700, the syntax analysis is performed on the application source. Specifically, the source code generally for one line as the unit source code of the syntax analysis is read from the application source. In Step S701, when the symbol name of each function is defined, it is searched whether there is that one in accord with the symbol name of a task in the task information within the RTOS setting information table S600. When it is found, the processing goes to Step S702. When it is not found, the processing goes to Step S703. In Step S702, the code expansion is performed not to output the code of the saving processing and the restoring processing of a resister overlapping with the processing within the RTOS. Upon completion of the code expansion, the processing is returned to Step S700.

In Step S703, when the symbol of a function is defined within the unit source code having been read, it is searched whether there is that one in accord with the symbol name of the interrupt handler in the interrupt handler information within the RTOS setting information table S600. When it is found, the processing goes to Step S704. When it is not found, the processing goes to Step S709.

In Step S704, it is determined whether or not a special instruction for defining the function found in Step S703 as the interrupt handler is described within the application source. When it is defined, the processing goes to Step S705. When it is not defined, the processing goes to Step S706.

In Step S705, the activation method of the interrupt, in the interrupt handler information within the RTOS setting information table S600 is set at "activation without interposing RTOS" and the processing goes to Step S707. In Step S707, the compiler 1 performs the code expansion necessary for the general interrupt handler without using the RTOS.

In Step S706, the activation method of the interrupt, in the interrupt handler information within the RTOS setting information table S600 is set at "activation through RTOS" and the processing goes to Step S708. In Step S708, the compiler 1 performs the code expansion not to output the code such as the saving and returning processing of a register overlapping with the processing within the RTOS.

In Step S709, it is determined whether or not the calling processing of the sub routine is within the task processing. The compiler 1 holds the internal state at a compile and after finding the symbol of a task, it keeps the state under the compile of the task until finding the finishing processing of a factor. Whether or not the sub routine calling processing found as the result of the syntax analysis is within the task processing is determined by the internal state of the compiler 1. When it is the sub routine calling processing within the task processing, the processing goes to Step S710. Otherwise, the processing goes to Step S711.

In Step S710, the symbol information of the sub routine found within the task is registered in the sub routine information S603 within the RTOS setting information table S600. When the pointer of the sub routine information in the task information S602 within the RTOS setting information table S600 is NULL, the pointer to the sub routine information is registered in the pointer of the sub routine information in the task information S602. When the pointer of the subroutine information is set in the task information S602, the set sub routine information S603 is obtained. When the pointer of the sub routine information within the obtained sub routine information S603 is NULL, the pointer to the sub routine information is registered in the pointer of the sub routine information S603. When a pointer to another sub routine information is set in the sub routine information S603, the set sub routine information S603 is obtained. This processing will be repeated until new sub routine information with the symbol name of a sub routine stored there can be registered.

In Step S711, it is determined whether or not the syntax analysis has been completed to the end of the file (EOF: End of File). When it has been completed to the end, the syntax analysis is finished. Otherwise, the processing goes to the next line and returns to Step S700, where the syntax analysis is performed again.

The description will be returned to FIG. 5.

When the syntax analysis of one file is completed in Step S503 and has been converted into an object file, the processing goes to Step S504.

In Step S504, it is determined whether or not the whole application source 2 input in the compiler 1 has been assembled. The determination is performed by checking whether or not the source file table created in Step S501 is referred to down to the bottom. The processing in Step S503 will be repeated until finishing all.

In Step S505, with reference to the task information S602 within the RTOS setting information table S600, the stack capacity of a task having the sub routine information is calculated. This operation will be specifically described as follows.

Figure 8:
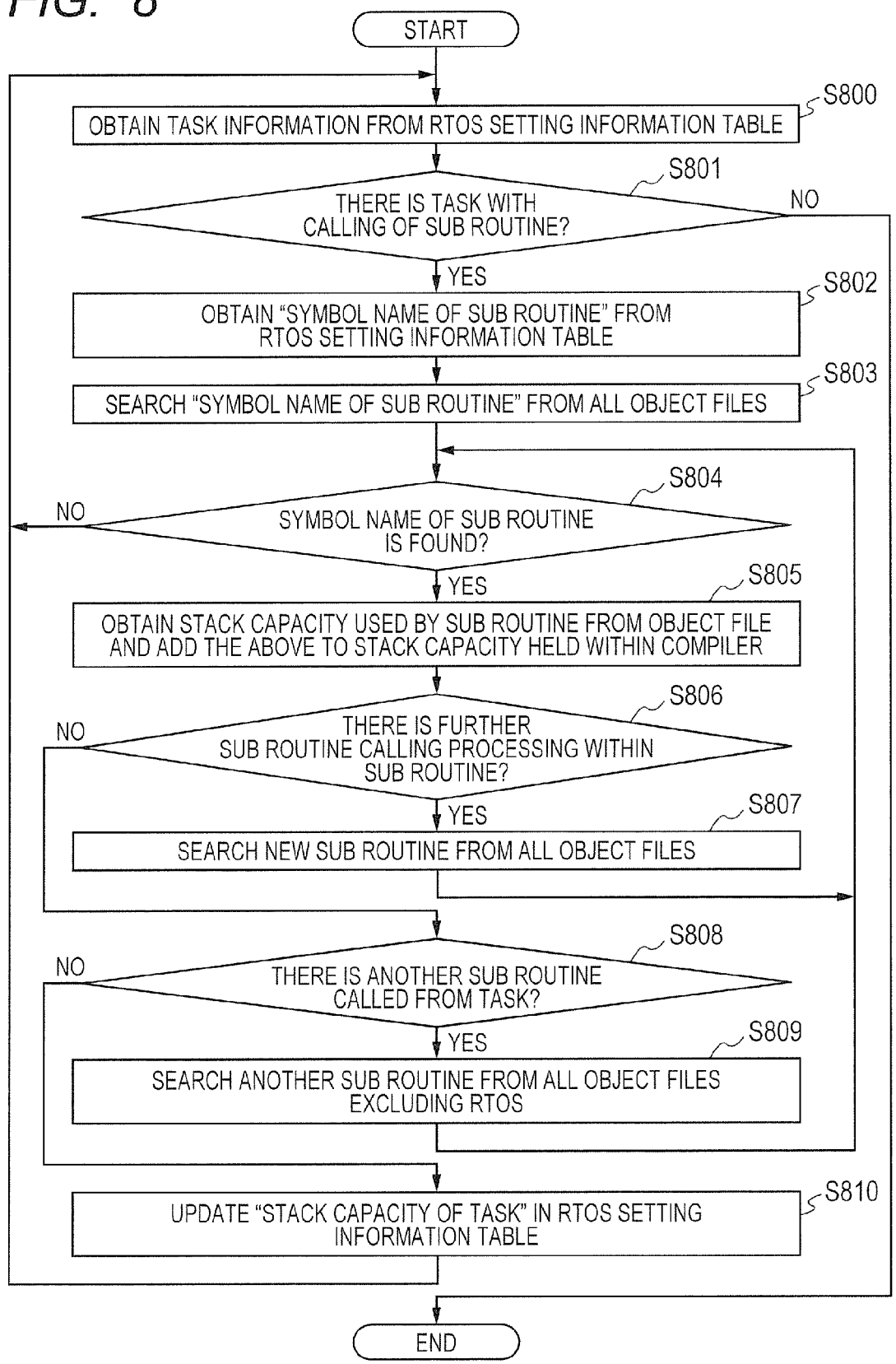
FIG. 8 is a flow chart showing one example of a calculation operation of a task stack capacity by the compiler according to the first embodiment.

FIG. 8 is a flow chart showing one example of a calculation operation of a task stack capacity according to the compiler 1 of the first embodiment.

In Step S800, at first, the task information S602 is obtained from the RTOS setting information table S600. In Step S801, it is searched for a task having the calling processing of the sub routine, from the obtained task information S602, starting from the head of the task information. Whether or not there is the calling processing of the sub routine is determined by whether or not an active address value is stored in the pointer of the sub routine information in the task information S602. When a task having the calling processing of the sub routine is found, the processing goes to Step S802. When it is not found, the calculation processing of the task stack is finished.

In Step S802, the symbol name of the sub routine is obtained from the RTOS setting information table S600 and then, the processing goes to Step S803. In Step S803, the symbol name of the sub routine is searched from all the object files. In Step S804, as the result of the search through all the object files, whether or not the symbol name of the sub routine is found is determined. When it is found, the processing goes to Step S805; when it is not found, the processing returns to Step S800.

When the symbol name of the function is not found in all the object files, a compile error is output before creating an executable file to interrupt the processing, similarly to the general compiler. In Step S805, referring to the debug information within the object file where the sub routine was found, the stack capacity used by the sub routine is obtained. The stack capacity used by the sub routine is calculated by cumulatively adding the stack capacity obtained from the object file to the stack capacity held within the compiler 1. In short, the stack capacity used by the sub routine obtained in Step S805 is temporarily held within the compiler until Step S808 has been completed. Next, the processing goes to Step S806.

In Step S806, whether the sub routine calling is further within the sub routine function is searched through the object files including the sub routines. When it is found, the processing goes to Step S807; when it is not found, the processing goes to Step S808. In Step S807, a new sub routine found in Step S806 is searched for from all the object files. Next, the processing goes to Step S804.

In Step S808, it is determined whether or not there is another sub routine called from a task function. The pointer of the sub routine information within the sub routine information S603 obtained in Step S802 and it is determined whether or not an active address value is stored. When there is the sub routine information, the symbol name of the next sub routine targeted for search is obtained and the processing goes to Step S809. When there is no sub routine information, the processing goes to Step S810.

In Step S809, the symbol name of the sub routine obtained in Step S808 is searched again through all the object files. Next, the processing goes to Step S804.

In Step S810, the stack capacity of a target task is obtained from the task information within the RTOS setting information table S600 and the maximum stack capacity to use, of the sub routine information registered for the target task, is added to the stack capacity of the task. The added value is stored in the stack capacity of the task within the RTOS setting information table S600. According to this, the RTOS setting information table S600 is updated.

The description will be returned to FIG. 5.

Upon completion of the calculation processing of the stack capacity of the task in Step S505, the processing goes to Step S506. Based on the updated RTOS setting information table S600 from Step S503 to S505, the system configuration file 5 is updated to create the RTOS setting information file in Step S506. The RTOS setting information file is a file where the initial values of the data managed by the RTOS is stored, based on the information of the system configuration file 5. The RTOS setting information file is an intermediate file, which is converted into a format capable of being combined with the executable file, to be output.

Based on the updated RTOS setting information data, the system configuration file 5 is rewritten. Further, the rewritten configuration file 5 is converted into the RTOS setting information file. A method of realizing the conversion includes a conversion method by activating the RTOS configurator of the related art within the compiler and a method of installing the RTOS configurator within the compiler.

In Step S507, the RTOS setting information file created in Step S506 is compiled and assembled to be replaced with the object file.

In Step S508, the object file created in Step S503 and the object file created in Step S507 are combined into one executable code and output to the executable file 6.

As mentioned above, the first embodiment is characterized by providing the RTOS setting information optimization unit 10 in the compiler 1. The compiler 1 reads the RTOS setting information described in the system configuration file 5 through the RTOS setting information optimization unit 10 and the output of the unnecessary code is suppressed at the compile of the task and the interrupt handler described in the application source 2. The compiler 1 optimizes the RTOS setting information described in the system configuration file 5, based on the information obtained through the compile and the assemble of the application source 2, in the RTOS setting information optimization unit 10.

The effect obtained according to this will be described with reference to FIGS. 9 and 10.

Figure 9:
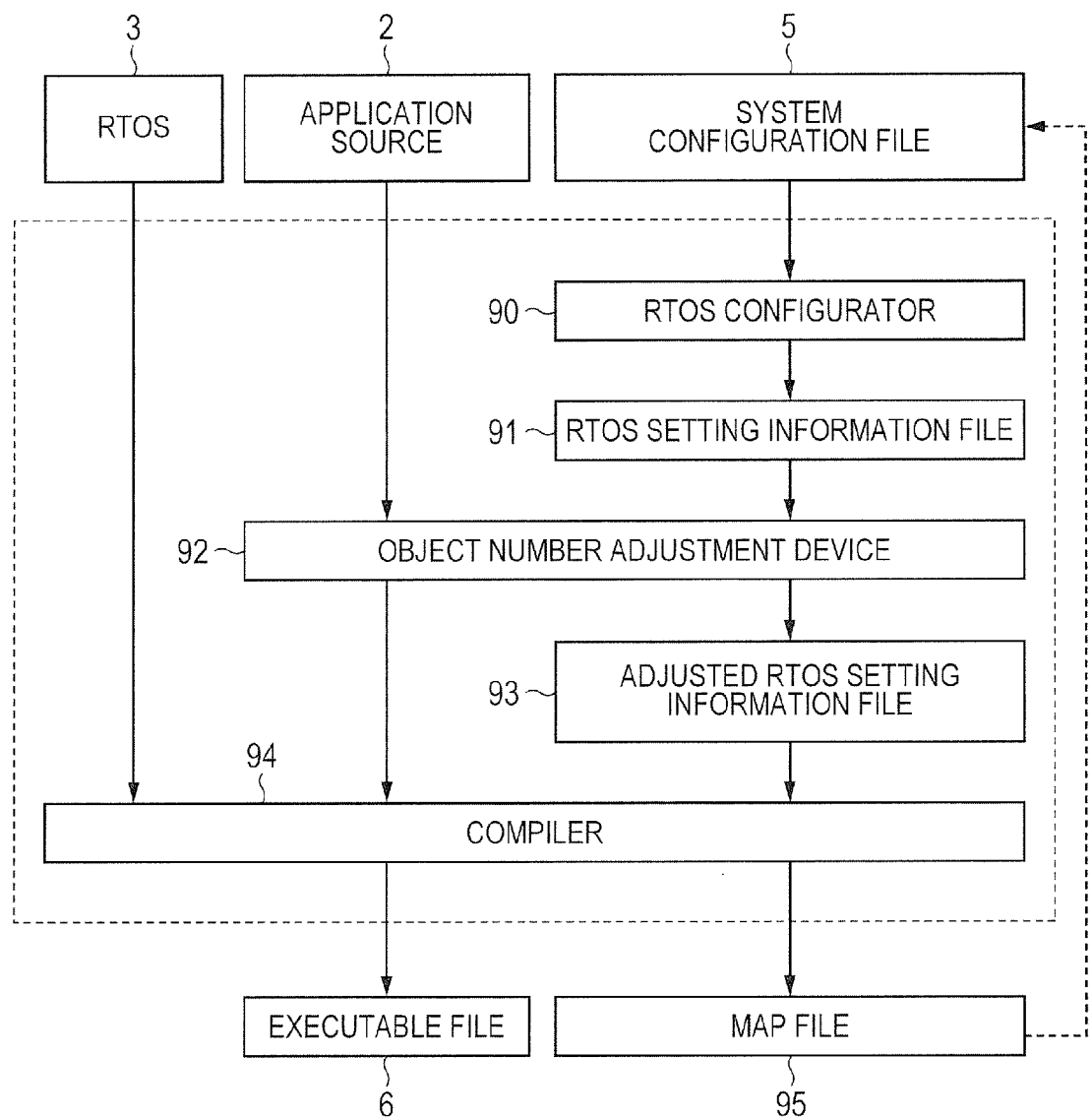
FIG. 9 is a view for use in schematically describing a flow of application configuration in the case of applying the related art.

FIG. 9 is a view for use in schematically describing the flow of the application configuration when the related art is applied.

In FIG. 9, at first, a user creates the application source 2 and the system configuration file 5. The system configuration file 5 is input to the RTOS configurator 90, to create the RTOS setting information file 91. The RTOS setting information file 91 and the application source 2 are input to an object number adjustment device 92, hence to create the adjusted RTOS setting information file 93. The adjusted RTOS setting information file 93, the application source 2, and the RTOS 3 are input to the compiler 94, hence to create the executable file 6.

In the related art, a means for creating the RTOS setting information file 91 from the system configuration file 5 and a means for creating the executable file 6 from the application source 2 are mutually independent; therefore, even when the setting items within the system configuration file 5 affect the code expansion of the compiler 94, the same setting is required for the application source 2. Therefore, the setting overlaps between the application source 2 and the system configuration file 5. Further, the optimum value obtained as the result from the compile and the assemble of the application source 2 has to be set manually.

For example, assume that an executable code generation device of creating the executable file 6 with the object number adjusted there, from the application source 2, the RTOS 3, and the system configuration file 5, is formed by the units included in a dotted line in FIG. 9. In this case, for example, the stack capacity used by a task can be obtained from a map file 95 output at the same time when the compiler 94 outputs the executable file 6. A user, however, has to reset the system configuration file 5 (dotted line arrow in FIG. 9) with reference to the map file 95. That is because it is not enough only to adjust the object number by the object number adjustment device 92.

Figure 10:
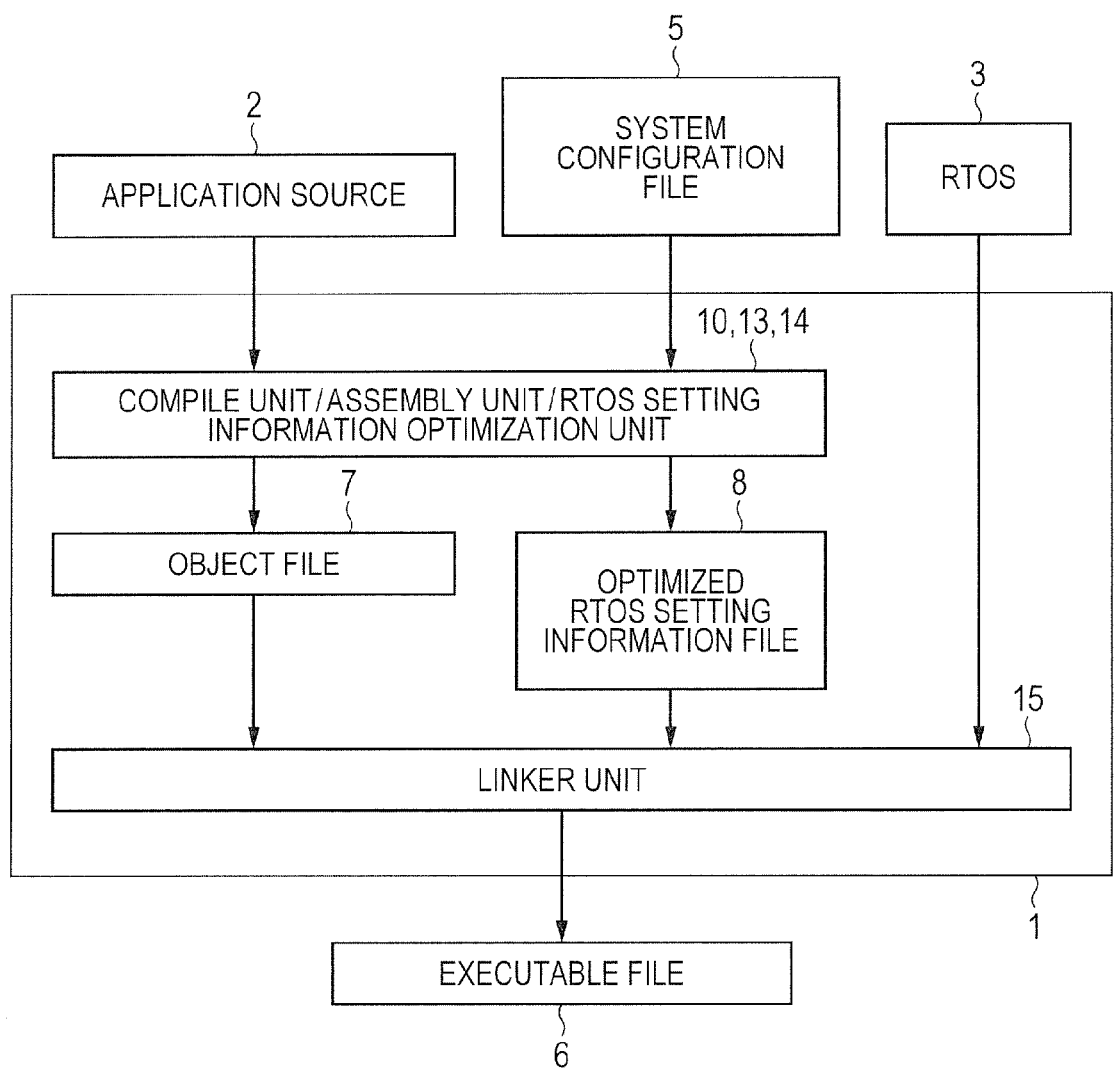
FIG. 10 is a view for use in schematically showing a flow of the application configuration according to the first embodiment.

FIG. 10 is a view for use in schematically describing the flow of the application configuration according to the first embodiment.

A user creates the application source 2 and the system configuration file 5 and inputs them to the compiler 1 together with the RTOS 3. As mentioned above, the compiler 1 includes the RTOS information optimization unit 10, in addition to the compile unit 13 and the assembly unit 14. The compile unit 13 and the assembly unit 14 create the object file 7 from the application source 2 and the RTOS information optimization unit 10 creates the optimized RTOS setting information file 8. The object file 7, the optimized RTOS setting information file 8, and the RTOS 3 are input to the linker unit 15, to create the executable file 6.

According to the first embodiment as mentioned above, based on the target application source code, the optimized RTOS setting information is created from the input system configuration information and a manual return to adjust the system configuration file 5 becomes unnecessary, thereby improving the efficiency in the development of the RTOS-mounted application.

Further, also from the assembly unit 14, the information of the object actually used by the application is extracted and supplied to the RTOS setting information optimization unit 10 as the information necessary for optimizing the RTOS setting information; therefore, the RTOS setting information based on the system configuration information is more properly optimized and the executable code is created based on the above.

Further, as having been described referring to FIG. 8, as for the size of a task stack, a proper value is calculated based on the object actually used by the application and based on the value, the executable code is created.

In the first embodiment, a means for creating the RTOS setting information file 8 from the system configuration file 5 and a means for creating the executable file 6 from the application source 2 are combined together; therefore, the compiler 1 performs the code expansion referring to the RTOS setting information described in the system configuration file 5. Based on the information obtained by the compile result, the RTOS setting information file is optimized. Therefore, the setting items overlapping between the application source 2 and the system configuration file 5 can be put together into one.

Further, by combination of the information obtained by the result from the compile and assemble of the application source 2 and the RTOS setting information obtained from the system configuration file 5, the RTOS setting information file can be optimized. Therefore, it is possible for a user to save a trouble of reviewing the RTOS setting information with reference to the result from the compile and the assemble and adjusting the setting of the system configuration file 5 (corresponding to the dotted line arrow in FIG. 9).

Second Embodiment

In the first embodiment, the RTOS setting information file is optimized based on the static information only; the RTOS setting information, however, includes the items not optimized enough by the static information: for example, the priority of each task, the priority of each interrupt handler, and the buffer size for use in the data synchronization communication. These setting items are optimized by repetition of try and error such as operating the application developed by a user in a development environment to receive the debug information and newly adjusting the setting of the system configuration file 5, based on the received debug information. Therefore, when many items are not fully optimized only by the static information, there is a fear of not fully improving the efficiency in the development of the RTOS-mounted application.

Similarly, the combination of the optimization option of the compiler cannot be fully optimized only by the static information. In the related art, there is known the optimization technique called "Profile Guided Optimization" of operating the application, collecting the information of the operation result, and determining the optimization option of the compiler, based on the collected information. This "Profile Guided Optimization" is performed from a viewpoint of speed, size, and power consumption. The "Profile Guided Optimization" in the related art, however, cannot optimize the RTOS setting information but only optimize the compile option. The second embodiment described hereinafter challenges to further improve the efficiency in the development of the RTOS-mounted application, by optimizing the RTOS setting information as for the dynamic items.

Figure 11:
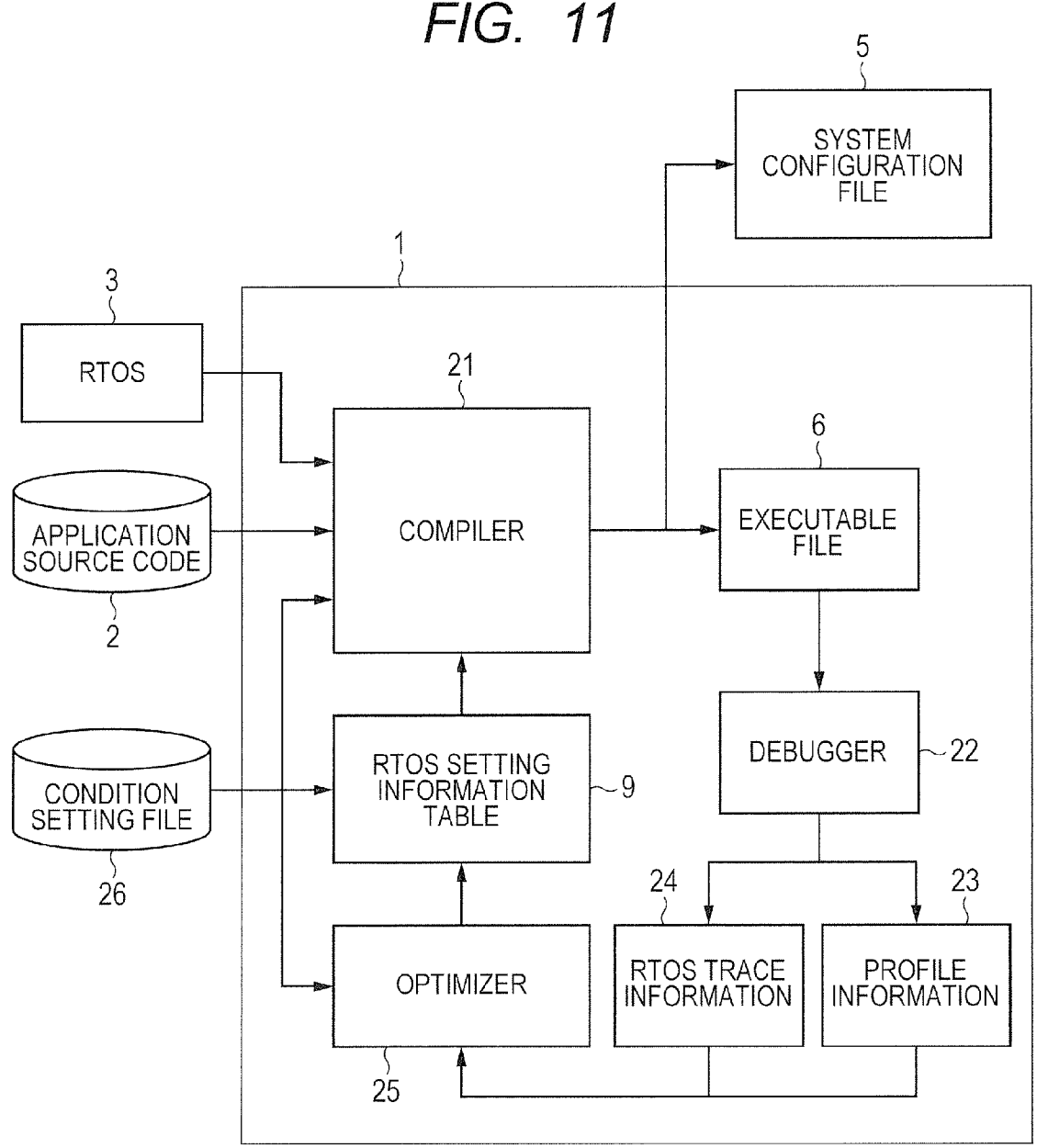
FIG. 11 is a block diagram showing the outline of a second embodiment.

FIG. 11 is a block diagram showing the outline of the second embodiment. The executable code generation device 1 inputs the application source code 2, the RTOS source code 3, the condition setting information stored in a condition setting file 26, creates the executable code of the RTOS-mounted application, and outputs the same to the executable file 6. Further, it may output the system configuration file 5 together.

Similarly to the compiler as one form of the executable code generation device according to the first embodiment, the executable code generation program is installed in the computer 40 as shown in FIG. 13 and the program is executed, hence to make the computer 40 work as the executable code generation device 1. The structure and the operation of the computer 40 are the same as those of the first embodiment having been described referring to FIG. 13 and their description is omitted.

The application source code 2 and the RTOS source code 3 are the same as those of the first embodiment. The condition setting file 26 includes the initial value of the RTOS setting information having been stored in the system configuration file 5 in the first embodiment and the option setting information 4, and further a precondition necessary for optimizing the RTOS setting information table, supplied to the optimizer 5. The precondition necessary for optimizing the RTOS setting information table includes, for example, the number of the objects such as a task and an interrupt handler and the information of the worse response time allowed to the interrupt handler.

The executable code generation device 1 includes the compiler 21, the RTOS setting information table 9, the optimizer 25, and the debugger 22.

Different from the compiler 1 according to the first embodiment, the compiler 21 does not include the RTOS setting information optimization unit 10 but includes, for example, the option analysis unit 11, the preprocess unit 12, the compile unit 13, the assembly unit 14, and the linker unit 15. The RTOS setting information table 9 is similar to the RTOS setting information table according to the first embodiment. The application source code 2 and the RTOS 3 are input to the compiler 21. The compiler 21 compiles the application source code 2, based on the RTOS setting information stored in the RTOS setting information table 9 and the option setting information stored in the condition setting file 26 as the condition setting information, creates the executable code of the RTOS built-in application, and outputs the above code to the executable file 6.

The executable code generation device 1 obtains the profile information 23 and the RTOS trace information 24 after inputting the created executable code in the debugger 22 and analyzing the same in the debugger 22. Upon receipt of the obtained profile information 23 and RTOS trace information 24, the optimizer 25 updates the RTOS setting information stored in the RTOS setting information table 9, with reference to the precondition necessary for optimizing the RTOS setting information table, of the condition setting information.

The executable code generation device 1, at first, sets the initial value of the RTOS setting information included in the condition setting file 26, in the RTOS setting information table 9. Then, the executable code is created by the compiler 21, the profile information 23 and the RTOS trace information 24 are created by the debugger 22, and the RTOS setting information is updated by the optimizer 25. Further, referring to the updated RTOS setting information, the above processing later than the creation of the executable code by the compiler 21 is repeated and when the condition defined in the condition setting file 26 is satisfied, the repetition is finished.

When the condition defined in the condition setting file 26 is satisfied, the executable file 6 includes the optimized RTOS setting information 66, similarly to FIG. 3 in the first embodiment. At this point, the RTOS setting information 66 is optimized with respect to the dynamic condition depending on the actual operation, in addition to the same static analysis as the first embodiment. The optimized RTOS setting information stored in the RTOS setting information table 9 may be output to the system configuration file 5.

According to this, it is possible to optimize the RTOS setting information also with respect to the condition that cannot be settled by only the static analysis, without a user's try and error for optimization, and to improve the efficiency in the development of the RTOS-mounted application.

FIG. 11 shows the form with the executable file 6 included in the executable code generation device 1 and the system configuration file 5 output from the executable code generation device 1, but this is only one example. In the repeated period described later, the executable file 6 as the internal information handed from the compiler 21 to the debugger 22, is formed to be included in the executable code generation device 1; however, it may be once output from the executable code generation device 1 and input to the debugger 22 again. The same is true to the system configuration file 5. The RTOS setting information table 9 is described as the internal information held in the executable code generation device 1; however, it may be stored in the system configuration file 5 and installed as the data to be updated. The same is true to the RTOS trace information 24 and the profile information 23. These may be output from the debugger 22 and input to the optimizer 25 again.

The operation of the executable code generation device 1 will be described. In the actually using state, when there is a change in the processing unit and the resources controlled by the RTOS, the RTOS stores the phenomenon and the trace data including the information of the occurrence timing into a trace buffer. The RTOS trace information 24 is formed by the trace data taken out from the buffer, obtained by inputting the executable code to the debugger 22. By analyzing the RTOS trace information 24, the execution time of a task and the response time of the interrupt handler can be calculated. As for the processing function and the interrupt not controlled by the RTOS, the running time and the response time can be calculated from the profile information 23.

Figure 12:
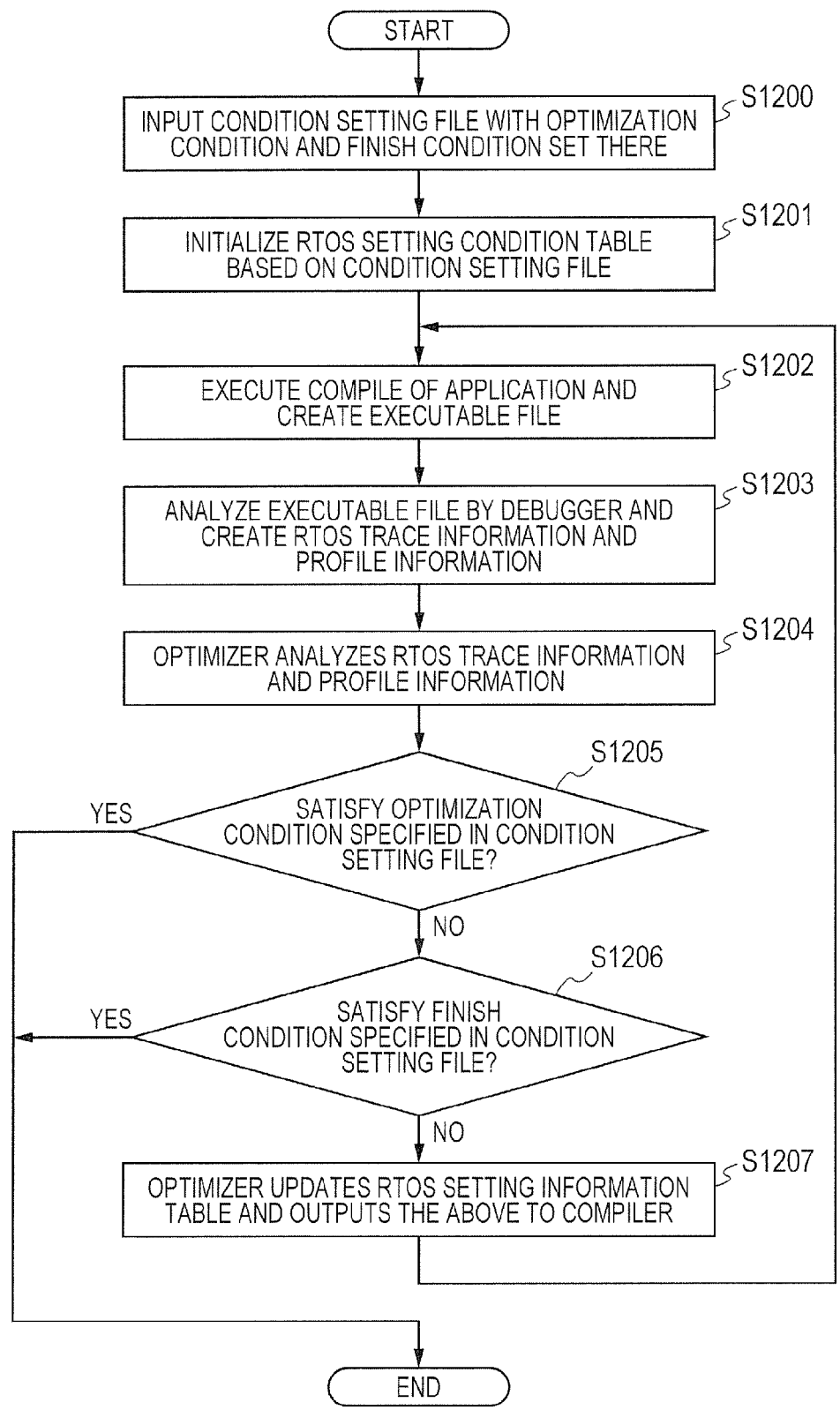
FIG. 12 is a flow chart showing an operation example of an executable code generation device according to the second embodiment.

FIG. 12 is a flow chart showing an operation example of the executable code generation device 1 according to the second embodiment.

In Step S1200, the optimization condition and the finish condition set in the condition setting file 26 by a user are input to the executable code generation device 1. In Step S1201, based on the input condition setting file 26, the RTOS setting condition table 9 is initialized.

In Step S1202, the compiler 21 compiles the application source 2 to create the executable file 6. Here, the option setting information of the compile is input from the condition setting file 26 and the RTOS 3 is built therein with reference to the RTOS setting condition in the RTOS setting condition table 9. In short, the created executable file 6 includes the RTOS code, the application code, the application data, and the RTOS setting information, similarly to FIG. 3. The RTOS setting information at this point is in the initial state and not optimized.

In Step S1203, the debugger 22 analyzes the executable file 6 and creates the RTOS trace information 24 and the profile information 23. The debugger 22 is realized by adding a monitor function for monitoring the internal state to a simulator or actual device for the target device 30 as shown in FIG. 2.

In Step S1204, the optimizer 25 analyzes the RTOS trace information 24 and the profile information 23. The optimizer 25 reads the optimization condition from the condition setting file 26. The optimization condition includes the worst response time of an interrupt handler and a ready-to-run time allowed to a task. Upon completion of the analysis of the RTOS trace information 24 and the profile information 23, the processing goes to Step S1205.

In Step S1205, it is determined whether or not the ready-to-run time of a task and the response time of the interrupt handler calculated from the RTOS trace information 24 and the profile information 23 meet the optimization condition. When the above meets the optimization condition, the creating processing of the executable file 6 is finished. When the above does not meet the optimization condition, the processing goes to Step S1206.

In Step S1206, it is determined whether or not the finish condition specified in the condition setting file 26 is satisfied. As the finish condition, for example, the number of repetition of a loop from Step S1202 to Step S1207 is specified. When the finish condition is satisfied, the creating processing of the executable file 6 is completed. When it is not satisfied, the processing goes to Step S1207.

In Step S1207, the RTOS setting information table 9 is updated. For example, when a specified interrupt handler does not satisfy the worse response time specified as the optimization condition, the priority of the interrupt handler is raised. The updated RTOS setting information (RTOS setting information table 9) for the optimization by the optimizer 25 is output to the compiler 21 and the processing returns to Step S1202.

According to this, the RTOS setting information stored in the RTOS setting information table 9 is repeatedly updated until satisfying the optimization condition specified in the condition setting file 26; at the completion of the repeated loop processing, the executable code created based on the optimized RTOS setting information (RTOS setting information table 9) is created and output to the executable file 6. Step S1206 is the processing in case of failing in the optimization. For example, when the optimization condition specified in the condition setting file 26 cannot be satisfied even after a predetermined number of repetition, it is determined whether or not the repetition is compulsorily stopped. In this case, the RTOS trace information 24 and the profile information 23 can be output to be analyzed by a user.

As mentioned above, although the invention made by the inventor et al. has been described based on the embodiments, it is needless to say that the invention is not restricted to these but that various modifications are possible without departing from the spirit thereof.

What is claimed is:

1. A non-transitory storage medium storing instructions of code generation program of creating executable code for running a real time operating system built-in application on a target device, by running the above code in a computer, the application being usable by calling resource of the real time operating system as an object, the above program comprising: a real time operating system setting information optimization unit of receiving system configuration information; and a compile unit of receiving application source code of the application, wherein the real time operating system setting information optimization unit creates real time operating system resource creating information including attribute information of a usable object and supplies the above information to the compile unit, based on the received system configuration information, wherein the compile unit analyzes the received application source code, to create first real time operating system setting information including a list of the objects called by the application and supply the above information to the real time operating system setting information optimization unit, and wherein the real time operating system setting information optimization unit creates optimized real time operating system setting information, based on the first real time operating system setting information and the system configuration information, and creates a real time operating system setting information file including the optimized real time operating system setting information, hence to create the executable code, based on the real time operating system setting information file, the application source code, and the real time operating system.

2. The non-transitory storage medium according to claim 1, further comprising: an assembly unit of receiving source code described in an assembly language, of the application source code, wherein the assembly unit analyzes the source code described in the assembly language, to create second real time operating system setting information including a list of the objects called by the application and supply the above information to the real time operating system setting information optimization unit, and wherein the real time operating system setting information optimization unit further creates optimized real time operating system setting information, based on the second real time operating system setting information, in addition to the first real time operating system setting information and the system configuration information.

3. The non-transitory storage medium according to claim 1, wherein the compile unit analyzes the received application source code, to extract sub routine information of sub routine called by the application, include the above information in the first real time operating system setting information, and supply the above to the real time operating system setting information optimization unit, and wherein the real time operating system setting information optimization unit calculates stack capacity of a task including the calling processing of the sub routine, the task being an object included in the first real time operating system setting information as a list, based on the sub routine information included in the first real time operating system setting information, to include the stack capacity in the optimized real time operating system setting information to create the real time operating system setting information file.

4. The non-transitory storage medium according to claim 3, wherein the optimized real time operating system setting information includes task information, interrupt handler information, and sub routine information, wherein the task information includes a symbol name of a task, a pointer indicating sub routine information about the sub routine called from the task, and the stack capacity of the task, wherein the interrupt handler information includes a symbol name of an interrupt handler and an activation method of the interrupt handler, and wherein the sub routine information includes a symbol name of the sub routine and a pointer indicating sub routine information of a lower sub routine when there is further the lower sub routine to be called by the sub routine.

5. The non-transitory storage medium according to claim 4, wherein as for each of a plurality of unit source codes forming the application source code, when analyzing the input application source code, the compile unit performs code expansion for a task, excluding code for saving processing and restoring processing of a register about the task within the real time operating system, when the unit source code includes the symbol name of the task, wherein when the unit source code includes a symbol name of an interrupt handler, it is determined whether or not a special instruction for the interrupt handler is specified within the application source code; when the above is specified, the activation method of the interrupt handler is set at a direct activation without interposing the real time operating system; when the above is not specified, the activation method of the interrupt handler is set at an activation method through the real time operating system; the activation method of the interrupt handler is included in the first real time operating system setting information to be created, and wherein when the unit source code includes the calling processing of a sub routine, the pointer indicating the sub routine information to be called is linked with the sub routine information in the task information and the task information is included in the first real time operating system setting information to be created.

6. An executable code generation device of creating executable code for running a real time operating system built-in application on a target device,
   the application being usable by calling resource of the real time operating system as an object,
   the above device comprising: a real time operating system setting information optimization unit of receiving system configuration information; and a compile unit of receiving application source code of the application,
   wherein the real time operating system setting information optimization unit creates real time operating system resource creating information including attribute information of a usable object and supplies the above information to the compile unit, based on the received system configuration information,
   wherein the compile unit analyzes the received application source code, to create first real time operating system setting information including a list of the objects called by the application and supply the above information to the real time operating system setting information optimization unit,
   wherein the real time operating system setting information optimization unit creates optimized real time operating system setting information, based on the first real time operating system setting information and the system configuration information, and creates a real time operating system setting information file including the optimized real time operating system setting information,
   hence to create the executable code, based on the real time operating system setting information file, the application source code, and the real time operating system.

7. The device according to claim 6, further comprising:
   an assembly unit of receiving source code described in an assembly language, of the application source code,
   wherein the assembly unit analyzes the source code described in the assembly language, to create second real time operating system setting information including a list of the objects called by the application and supply the above information to the real time operating system setting information optimization unit, and
   wherein the real time operating system setting information optimization unit further creates optimized real time operating system setting information, based on the second real time operating system setting information, in addition to the first real time operating system setting information and the system configuration information.

8. The device according to claim 6,
   wherein the compile unit analyzes the input application source code, to extract sub routine information of sub routine called by the application, include the above information in the first real time operating system setting information, and supply the above to the real time operating system setting information optimization unit, and
   wherein the real time operating system setting information optimization unit calculates stack capacity of a task including the calling the processing of the sub routine, the task being an object included in the first real time operating system setting information as a list, based on the sub routine information included in the first real time operating system setting information, to include the stack capacity in the optimized real time operating system setting information to create the real time operating system setting information file.

9. The device according to claim 8,
   wherein the optimized real time operating system setting information includes task information, interrupt handler information, and sub routine information,
   wherein the task information includes a symbol name of a task, a pointer indicating the sub routine information about the sub routine called from the task, and the stack capacity of the task,
   wherein the interrupt handler information includes a symbol name of an interrupt handler and an activation method of the interrupt handler, and
   wherein the sub routine information includes a symbol name of the sub routine and a pointer indicating sub routine information of a lower sub routine when there is further the lower sub routine to be called by the sub routine.

10. The device according to claim 9,
    wherein as for each of a plurality of unit source codes forming the application source code, when analyzing the input application source code,
    the compile unit performs code expansion for a task, excluding code for saving processing and restoring processing of a register about the task within the real time operating system, when the unit source code includes the symbol name of the task,
    wherein when the unit source code includes the symbol name of the interrupt handler, it is determined whether or not a special instruction for the interrupt handler is specified within the application source code; when the above is specified, the activation method of the interrupt handler is set at a direct activation without interposing the real time operating system; when the above is not specified, the activation method of the interrupt handler is set at an activation method through the real time operating system; the activation method of the interrupt handler is included in the first real time operating system setting information to be created, and
    wherein when the unit source code includes the calling processing of a sub routine, the pointer indicating the sub routine information to be called is linked with the sub routine information in the task information and the task information is included in the first real time operating system setting information to be created.

11. A method to be executed in a computer, for operating the computer as an executable code generation device including a compiler, a real time operating system setting information table, an optimizer, and a debugger and creating executable code for executing a real time operating system built-in application on a target device, wherein the application is usable by calling resource of the real time operating system as an object, wherein the real time operating system setting information table is initialized by condition setting information to be received, wherein the compiler performs a first step of, upon receipt of application source code of the application and the real time operating system, compiling the application source code, based on the real time operating system setting information stored in the real time operating system setting information table and the condition setting information, and outputting executable code of the real time operating system built-in application, wherein the debugger performs a second step of analyzing the executable code to create real time operating system trace information and profile information, and supplying the above information to the optimizer, wherein the optimizer performs a third step of updating the real time operating system setting information stored in the real time operating system setting information table, based on the real time operating system trace information, the profile information, and the condition setting information, and wherein the first, second, and third steps are repeatedly performed and the repetition is finished when condition defined in the condition setting information is satisfied.

12. The method according to claim 11, wherein the condition setting information includes optimization condition, and wherein in the third step, the optimizer analyzes the real time operating system trace information and the profile information, determines whether or not the optimization condition is satisfied; updates the real time operating system setting information stored in the real time operating system setting information table when the above condition is not satisfied; and finishes the repetition when the above condition is satisfied.

13. The method according to claim 12, wherein the optimization condition includes information of allowable worse response time of an interrupt handler, wherein the real time operating system setting information includes information of specifying priority of the interrupt handler, and wherein in the third step, the optimizer analyzes the real time operating system trace information, calculates a response time of the interrupt handler, determines whether or not a condition of being within the worse response time is satisfied; updates the priority of the interrupt handler in the real time operating system setting information stored in the real time operating system setting information table when the condition is not satisfied.

* * * * *